(12) United States Patent
Held

(10) Patent No.: US 11,261,639 B2
(45) Date of Patent: Mar. 1, 2022

(54) FLUID DAMPER FOR BODIES THAT ARE MOVABLE RELATIVE TO ONE ANOTHER, COMPRISING A PISTON THAT IS MOVABLY GUIDED IN A CYLINDER

(71) Applicant: Wolfgang Held, Hard (AT)

(72) Inventor: Wolfgang Held, Hard (AT)

( * ) Notice: Subject to any disclaimer, the term of this patent is extended or adjusted under 35 U.S.C. 154(b) by 69 days.

(21) Appl. No.: 16/635,955

(22) PCT Filed: Aug. 2, 2018

(86) PCT No.: PCT/EP2018/071062
§ 371 (c)(1),
(2) Date: Jan. 31, 2020

(87) PCT Pub. No.: WO2019/025568
PCT Pub. Date: Feb. 7, 2019

(65) Prior Publication Data
US 2020/0240190 A1 Jul. 30, 2020

(30) Foreign Application Priority Data
Aug. 2, 2017 (EP) ..................................... 17184424

(51) Int. Cl.
*E05F 5/10* (2006.01)
*E05F 5/02* (2006.01)
(Continued)

(52) U.S. Cl.
CPC .................. *E05F 5/10* (2013.01); *E05F 5/02* (2013.01); *E05Y 2201/21* (2013.01);
(Continued)

(58) Field of Classification Search
CPC .......... E05F 5/10; E05F 5/02; E05Y 2201/21; E05Y 2201/256; E05Y 2900/20; F16F 9/19; F16F 9/512
See application file for complete search history.

(56) References Cited

U.S. PATENT DOCUMENTS 5,579,874 A * 12/1996 Jeffries ..................... E05F 1/16
188/282.9
5,988,330 A * 11/1999 Morris ................. B60G 15/062
188/319.1

(Continued)

FOREIGN PATENT DOCUMENTS

DE     202014 002228 U1    5/2014
FR         2347575 A1      11/1977
(Continued)

*Primary Examiner* — Victor D Batson
*Assistant Examiner* — Matthew J Sullivan
(74) *Attorney, Agent, or Firm* — John Alumit

(57) ABSTRACT

The invention relates to a fluid damper for bodies that are movable relative to one another, said damper comprising a piston that is movably guided in a cylinder. At least one through opening is provided in the piston and/or between the piston and the cylinder for through-flowing fluid. Adjustment means are provided on the fluid damper for adjusting a limitation least of the maximum possible through-flow cross section for the fluid at least one passage opening. The piston is connected to a piston rod leading out of the cylinder. The adjustment means comprises detent connection which is pushed, in a radially non-twistable manner, onto the end of the piston rod located in the cylinder, and holds the piston in a desired position in the cylinder.

3 Claims, 2 Drawing Sheets

(51) Int. Cl.
*F16F 9/19* (2006.01)
*F16F 9/512* (2006.01)

(52) U.S. Cl.
CPC ..... *E05Y 2201/256* (2013.01); *E05Y 2900/20* (2013.01); *F16F 9/19* (2013.01); *F16F 9/512* (2013.01)

(56) References Cited

U.S. PATENT DOCUMENTS

| | | | |
|---|---|---|---|
| 6,374,089 B1 * | 4/2002 | Till | H04M 1/0216 455/90.1 |
| 7,410,154 B2 * | 8/2008 | Lam | E05F 5/02 267/221 |
| 7,861,371 B2 * | 1/2011 | Kim | F16F 13/007 16/85 |
| 9,719,285 B2 * | 8/2017 | Nagi | E05F 3/20 |
| 9,921,013 B1 * | 3/2018 | Oglesby | F41A 3/80 |
| 10,865,597 B2 * | 12/2020 | Chen | F16F 13/007 |
| 2009/0090587 A1 * | 4/2009 | Tomita | F16F 9/3214 188/282.6 |
| 2011/0094056 A1 * | 4/2011 | Lautenschlager | E05F 5/10 16/84 |
| 2019/0390496 A1 * | 12/2019 | Bacchetti | E05F 5/003 |

FOREIGN PATENT DOCUMENTS

| | | |
|---|---|---|
| JP | H01 145440 A | 6/1989 |
| WO | WO2007/099100 | 9/2007 |

\* cited by examiner

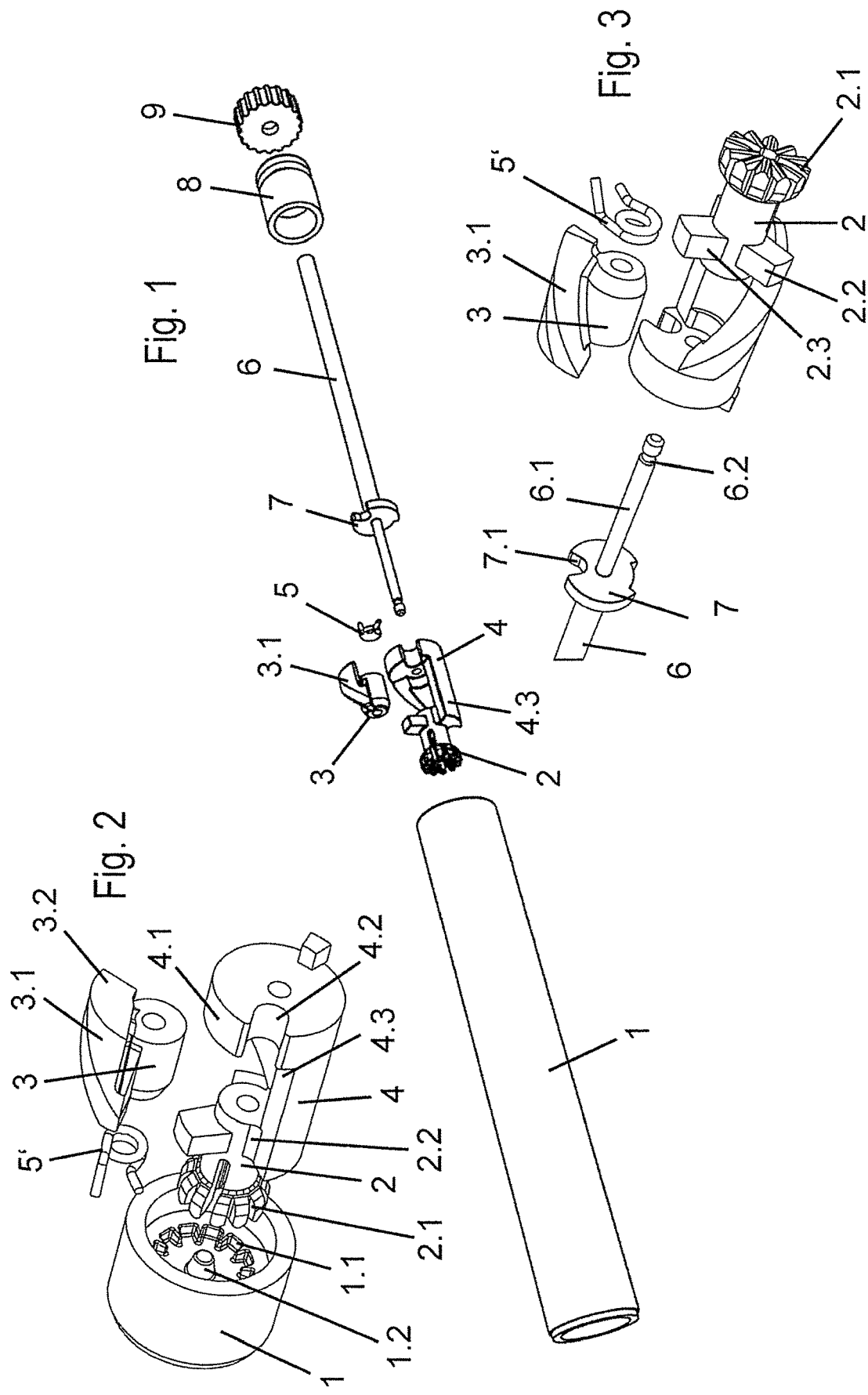

FLUID DAMPER FOR BODIES THAT ARE MOVABLE RELATIVE TO ONE ANOTHER, COMPRISING A PISTON THAT IS MOVABLY GUIDED IN A CYLINDER

The invention relates to a fluid damper for bodies adjustable counter to one another, in particular furniture parts, having a piston guided adjustably in a cylinder, as defined by the preamble to claim 1.

The piston subdivides the cylinder into two fluid chambers. So that upon a motion of the piston in the cylinder along its longitudinal axis or cylindrical axis a fluid exchange can take place between the two fluid chambers, at least one through opening in the piston and/or between the piston and the cylinder is provided.

Upon an axial motion of the piston rod and thus of the piston counter to the cylinder, the fluid must flow through the through opening in the piston and/or between the piston and cylinder. Because of the resistance that is presented to the fluid, pressure differences between the fluid chambers are created, which bring about a damping force.

In one such fluid damper in DE 20 2014 002 228 U1, the piston is connected to a piston rod extending out of the cylinder. The piston rod can be put into contact with an adjustable furniture part. The cylinder is connected by its end that is closed and free of a piston rod to the fixed furniture part. In the piston, a through opening for a fluid located in the cylinder is provided. When the bodies move relative to one another, a wing supported rotatably on the piston closes progressively in the piston as a function of the speed or the pressure on the piston rod, along with a shrinkage of the flow cross section. When the bodies move away from one another, a spring moves the wing on the piston back and opens the through opening. The cylinder is closed on the open face end with a closure part.

A fluid damper is also known from DE 20 2005 020 820 U1. So that in this known fluid damper in the event of an overload, that is, with great imposition of pressure, extreme damping is prevented, it is proposed that above a threshold value of the pressurization impacting the fluid damper, at least one overload opening in the piston and/or between the piston and the cylinder is opened. This prevents the damper chatter and a hard closure of the furniture parts is averted, without attaining the threshold value of the pressure load by means of a special embodiment of the through opening in the piston, or between the piston and cylinder, and without having to choose special forms and sizes of the through openings.

In the prior art it is a common feature that the resistance is prescribed for instance by the size of the through openings. Adjusting the resistance at the fluid damper, as may be required to suit various intended uses, in order to adapt to bodies that while they are adjustable counter to one another are also typically large and variously heavy, and accordingly variously sluggish, cannot be done.

From WO 2007/099100, a damper for furniture is known. It includes a housing in which a piston connected to a piston rod is received displaceably. When the piston moves inside the housing, a fluid flows through a flow conduit in or on the piston. When the piston moves in different directions, a different damping is obtained. This is done by means of a plate that is relatively movable in the direction of motion of the piston. Protrusions are located on the plate toward the piston and define a smallest cross section of the flow conduit in a first direction of motion. In the opposite direction of motion, the plate can lift away from the piston and thus makes a larger cross section available. The flow conduit can be adapted to various desired damping properties by means of variously tall protrusions on the plate. As a result, by means of different plates with variously tall protrusions, dampers with various damping properties are obtained. Without replacing the particular constructed plate, which involves taking a finished damper apart, no change in the damping properties is possible. This makes it impossible to attain a simple, later adaptation of the damping properties of a finished damper.

From DE 195 32 996 B4, a gas spring is known, in which the speed with which a piston rod connected to a piston guided longitudinally displaceably in a cylinder and subdividing the cylinder into two fluid chambers moves outward, is adjustable by varying the length of a flow path leading through the piston. The cross section of the flow path is unchanged if there is a change in the length of the flow path. The piston is guided movably along the piston rod and in its rotary position about the longitudinal axis of the cylinder.

From WO 85/04935 A1, a linear damper is known that has a piston that is guided in a cylinder along the longitudinal axis of the cylinder and is movable about it in its rotary position. The piston subdivides the cylinder into two fluid chambers. Through openings for the fluid equalization required between the fluid chambers in order to move the piston along the longitudinal axis are located in the piston. In at least some of the through openings, one-way valves are located. An adjusting disk movable with the piston along the longitudinal axis can be rotated from outside the cylinder via an adjusting shaft extending along the longitudinal axis and connected to an adjusting wheel, in order to switch among three settings:

the same high flow resistance upon motion of the piston counter to the cylinder in both opposite directions along the longitudinal axis of the cylinder;

high flow resistance upon motion of the piston in a first direction, low flow resistance upon motion of the piston in a second direction opposite the first direction; and low flow resistance upon motion of the piston in the first direction, high flow resistance upon motion of the piston in the second direction opposite the first direction.

From DE 1996320 U, a hydraulic damper is known. This damper includes a cylinder and a piston, the piston being located along the longitudinal axis of the cylinder and being located such that it is movable about it in its rotary position, and subdividing a cylinder into two fluid chambers. A closing plate provided with channels, which is pressed against the piston by a spring loading is located rotatably about a piston rod. In the piston, there are through openings for the fluid equalization required between the fluid chambers in order to move the piston along the longitudinal axis. Depending on the rotary position of the closing plate selected, the through openings are opened to a greater or lesser extent. Accessibility or even adjustability of the closing plate for later influence on the fully assembled damper for opening the through openings is not provided for.

The object of the invention is to further improve the fluid damper defined by the preamble to claim 1, specifically to adapt it to various intended uses. This stated object is attained by the features of claim 1.

Advantageous embodiments are defined in the dependent claims.

Because the geometric cross section of at least one through opening in the piston and/or between piston and cylinder can be pre-adjusted, the fluid damper can be adapted to various intended uses, for instance at compartment/drawer lids and doors of a cabinet.

The pre-adjustability is advantageously available in the fully assembled fluid damper that is ready for use. Especially advantageously, the pre-adjustability is accessible from outside of the fully assembled fluid damper that is ready for use. This is attained according to the invention in particular in that the piston, by means of a detent connection is movably guided in the same constant rotary position—or position for short—relative to the cylinder, along the longitudinal axis. The nonrotatability, that is, a rigid connection, can exist for instance about a common longitudinal axis. The nonrotatability can in particular exist until such time as the detent connection of the piston does not form-fittingly engage a part of the cylinder. The nonrotatability can in particular be effected by means of friction, which can be overcome in the case of a form-fitting engagement of the detent connection with a part of the cylinder, in particular by means of a rotary motion of the piston.

The detent connection can for example be a groove or a protrusion in the cylinder parallel to its longitudinal axis and a corresponding embodiment of the piston. The corresponding embodiment can for instance include or have a lug sliding in the groove or a notch sliding on the protrusion on the circumference of the piston.

Fundamentally it is conceivable that the detent connection includes a cross-sectional geometry of the cylinder, and of the piston guided movably in the cylinder, that deviates from the circular shape.

The detent connection according to the invention creates the possibility of adjusting" a limitation. This limitation can at least include the largest possible through-flow cross section of the fluid, also called the effective cross section of the at least one through opening. The effective cross section can be located at at least one point of the through opening on the operationally ready, fully assembled fluid damper, preferably already built in between bodies adjustable relative to one another.

For example, a through-flow cross section of the fluid can be varied from outside the cylinder, for instance by means of a rotary motion about the longitudinal axis of the cylinder. This can be done at least one point of the through opening. If there is no detent connection, the piston could on the one hand rotate relative to the cylinder. If there is an unwanted change in the rotary position of the piston relative to the cylinder, an adjustment of a limitation of at least the largest possible through-flow cross section of the fluid at the through opening made by a rotary motion can disadvantageously be variable.

Further embodiments of the fluid damper can be learned from the dependent claims.

Thus according to a further advantageous embodiment of the invention, the detent connection can be constructed from the following components:
 a locking element in the form of a sleeve that can be slipped onto the end of the piston rod;
 the end of the sleeve, which is oriented toward the closed end of the cylinder, has a external gear;
 the other end of the sleeve (in the longitudinal direction of the cylinder) has at least one cam, which engages the piston;
 a internal gear, located on the interior on the closed end of the cylinder, which meshes with the external gear; and
 a central cone, located on the inside on the closed end of the cylinder, that presses the teeth of the external gear apart into the internal gear.

In a further advantageous embodiment of the invention, an adjusting wheel is secured, fixed against rotation, on the end of the piston rod located outside the cylinder. Preferably, this adjusting wheel has an external fluting.

The invention will now be described in further detail in conjunction with the drawings. In the drawings:

FIG. 1 is a perspective exploded view of a fluid damper comprising a cylinder, locking element, sleeve with wing, spring, piston, piston rod, notched disk, closure part, and adjusting wheel;

FIG. 2 is an enlarged perspective exploded view of the closed end part of the cylinder and components of the fluid damper of FIG. 1 that can be inserted there;

FIG. 3 is a further enlarged perspective exploded view of components of the fluid damper of FIG. 1;

Figure 4:
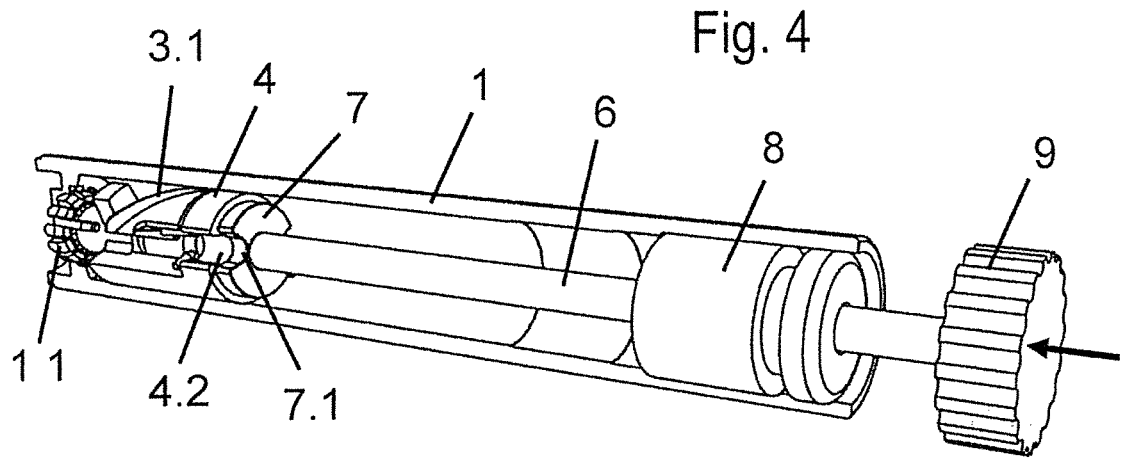
FIG. 4 is a perspective view of the fluid damper, similar to FIG. 1 but in the assembled state, in which the wing and the notched disk are in the outset state.
Figure 5:
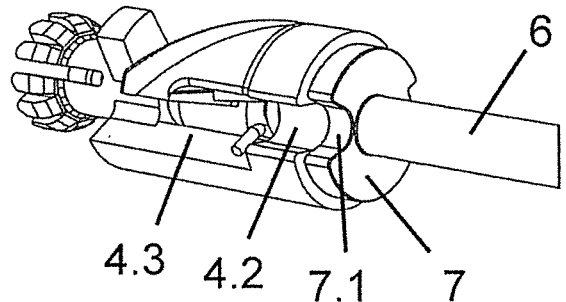
FIG. 5 is an enlarged perspective view of the left-hand portion of FIG. 4 with the cylinder cut open.

A fluid damper for bodies that are adjustable relative to one another, shown in its entirety or in parts in FIGS. 1 through 7, is equipped with a piston 4 guided adjustably in a cylinder 1.

The piston 4 subdivides the cylinder into two fluid chambers. So that upon a motion of the piston 4 in the cylinder along its longitudinal axis or cylinder axis, a fluid exchange can take place between the two fluid chambers, at least one through opening 4.2 for fluid flowing through is provided in the piston 4 and/or between the piston 4 and the cylinder 1.

The piston 4 is embodied cylindrically and advantageously is adapted in its external diameter to the internal diameter of the cylinder 1.

Alternatively, a gap between the internal diameter of the cylinder 1 and the external diameter of the piston 4 forms one of a plurality of through openings 4.2.

The fluid damper is distinguished by at least one adjusting means for later adjustment of a limitation of at least the largest possible through-flow cross section of the fluid, also called an effective cross section of the at least one through opening 4.2. The adjustment of the effective cross section is done at at least one point of the through opening 4.2 on the fluid damper that has been fully assembled and preferably already built in between bodies that are adjustable relative to one another.

The adjusting means is or are accessible and/or adjustable at least without requiring taking apart the fully assembled fluid damper that is ready for use. The adjusting means is or are especially advantageously accessible and/or adjustable from outside of the fully assembled fluid damper that is ready for use.

With the at least one adjusting means, at least the largest possible through-flow cross section of the fluid at the point of the fluid through opening 4.2 of the piston 4 can be pre-adjusted.

The restriction of there being a limitation of at least the largest possible through-flow cross section of the fluid at the through opening 4.2 makes for two possible embodiments:
 1. on the one hand a constant through-flow cross section prevails during the work of the fluid damper;
 2. on the other, the through-flow cross section varies during the work of the fluid damper.

For instance, the through-flow cross section is progressively reduced with increasing speed of motion of the piston 4 in the cylinder 1. The adjustment device in the latter case serves to define the maximum through-flow cross section per pre-adjustment that prevails when the piston 4 is not in motion.

The through-flow cross section is the geometric cross section which is available to the fluid for flowing from the one fluid chamber into the other, at least at a latest or narrowest point of the through opening 4.2. The smaller the cross section, the greater is the flow resistance acting on the fluid as it flows from one fluid chamber to the other. With an increasing cross section, the flow resistance decreases, as a result of which, as a consequence of the same force acting on the piston with a larger cross section and less flow resistance in comparison to a smaller cross section and higher flow resistance, a faster motion of the piston 4 in the cylinder 1 takes place.

It is important to stress that a change in the geometric cross section in the context of the invention includes in particular a change in the cross-sectional area, but alternatively or in addition can also include a change in the cross-sectional geometry and/or cross-sectional measurements. Thus the presetting of at least the largest possible through-flow cross section can be done along with a change in the geometry of the orifice of the fluid through opening 4.2 of the piston 4; for instance, because of a narrowing/change in the largest possible through-flow cross section, an otherwise continuously constant through opening becomes a Borda-Carnot orifice, at least in a through-flow direction.

Because the invention has an influence on the geometric cross section, in the case of the flow resistance occurring during the through-flow, the flow path, which in the fluid damper of the invention is already at least essentially constant in length, remains unaffected.

As a result, the invention makes it easily possible to exert subsequent influence on the hydraulic cross section of the fluid through opening 4.2 of the fully assembled fluid damper.

The piston 4 can be connected to a piston rod 6 extending out of the cylinder 1. The adjusting means advantageously include a detent connection, which is slid radially nonrotatably onto the end of the piston rod 6 located in the cylinder, which detent connection fixes the piston 4 in a desired location in the cylinder 1.

The desired position in which the detent connection keeps the piston 4 radially nonrotatable in the cylinder 1 accordingly involves the rotary position of the piston 4 relative to the cylinder 1 about an advantageously common longitudinal axis of the piston 4 and cylinder 1. A motion of the piston 4 and cylinder 1 relative to one another along the longitudinal axis, conversely, does not impair the detent connection at all.

As a result, the fully assembled fluid damper that is ready for use is pre-adjustable. This is attained in particular in that the piston 4, thanks to or via the detent connection, is guided movably and nonrotatably along the longitudinal axis in a rotary position, or position for short, relative to or counter to the cylinder 1 for instance about a common longitudinal axis.

The detent connection can for instance be formed by a groove or a protrusion in the cylinder 1, parallel to the longitudinal axis of the cylinder, and/or a corresponding embodiment of the piston, for instance with a lug sliding in the groove, or a notch sliding on the protrusion on the circumference of the piston 4, or include such means. It is fundamentally conceivable that the detent connection includes a cross-sectional geometry of the cylinder 1 and of the piston guided movably in it that deviates n shape from the circular.

According to the invention, the detent connection creates the possibility of adjusting a limitation of at least the largest possible, also called effective, cross section of the through-flow cross section of the fluid known as at least one through opening 4.2, at at least one point of the through opening 4.2 in the fluid damper that is ready for use, fully assembled, and preferably already built in between bodies that are adjustable relative to one another.

For instance, from outside the cylinder 1, in particular by means of an easily accomplished rotary motion—whether by rotating the piston rod about the longitudinal axis of the cylinder or by means of a separate shaft guided parallel to the piston rod—influence can be exerted on a through-flow cross section of the fluid at at least one point of the through opening 4.2.

In this connection it is apparent that the detent connection—and with it the adjusting means, singular or plural—can alternatively or in addition include such a shaft. Such a shaft can be located parallel and/or coaxially to the piston rod and/or can include the piston rod.

Without a detent connection, on the one hand the piston 4 could rotate relative to the cylinder 1, and on the other, as a result of a change in its rotary position relative to the cylinder 1, an adjustment of a limitation of at least the largest possible through-flow cross section of the fluid at the through opening 4.2, resulting from a rotary motion, could be undone.

In this connection, it should be emphasized that in the present document, the term "axis", in contrast to the terms "shaft" or "piston rod", means a geometrical axis, not a machine element.

Alternatively or in addition, the adjusting means can include a notched disk 7 secured nonrotatably to the piston rod 6. By means of at least one notch 7.1 on the notched disk 7, the through-flow cross section of the fluid can be pre-adjusted at the point of at least one through opening 4.2, also called fluid through opening, of the piston 4 and/or between the piston 4 and the cylinder 1. A further notch 7.2 on the notched disk 7 can be in engagement with a lug 4.4 on the piston 4, and an adjustability of the throttling of the fluid flow through the opening 4.2 can be limited. The throttling of the fluid flow can in particular be accomplished by means of a relative position of the opening 4.2 and notch 7.2.

The adjusting means accordingly advantageously includes or include at least one adjusting device affecting at least the largest possible through-flow cross section of the fluid at the at least one through opening 4.2. Preferably, the adjusting means includes or include at least one actuating device, which cooperates with the adjusting device or acts on it and is accessible later from outside on the fluid damper that is fully assembled and ready for use and preferably built in between bodies that are adjustable relative to one another. This actuating device is embodied for changing a limitation, which is operative in use or upon actuation of the fluid damper, of at least the largest possible through-flow cross section of the fluid at the location of the through opening 4.2 of the piston 4 and/or between the piston 4 and cylinder 1 each time there is a pre-adjustment.

In the above-described exemplary embodiment, the piston rod 6 forms the actuating device, which is accessible from outside and is actuated by rotation and thereby acts on the rotary position of the notched disk 7.

The adjusting device can be defined by the following features:

The notched disk 7, located nonrotatably relative to the piston rod 6, with its at least one notch 7.1;

this disk keeps the piston 4 in a desired location in the cylinder 1 and thus a joint rotation of the piston rod 6 and thus a detent connection that prevents joint rotation of the piston rod 6 and of the piston 4; and with the piston, the circumferential position of the at least one through opening 4.2 is fixed relative to the cylinder 1.

Preferably, the detent connection comprises the following components:

a locking element 2 in the form of a sleeve that can be applied to the end 6.1 of the piston rod and the end of which sleeve, facing toward the closed end of the cylinder 1, has a external gear 2.1 and on the other end at least one cam 2.2 engaging the piston 4;

a internal gear 1.1, located inside at the closed end of the cylinder 1 and which is engaged by the external gear 2.1; and a central cone 1.2, located on the inside at the closed end of the cylinder 1, which cone presses the teeth of the external gear apart into the internal gear 1.1.

For better actuation, an adjusting wheel 9 can be secured nonrotatably to the end of the piston rod 6 located outside the cylinder 1.

In this connection, at least one rotary direction indication, for instance in the form of an arrow or double arrow, for instance with symbols indicating enlargement and/or reduction in size of the through-flow cross section, is conceivable, for instance by means of a plus and/or minus symbol and/or a large and/or small circle, in which direction upon rotation of the piston rod 6 relative to the cylinder 1 the through-flow cross section is enlarged and reduced in size.

Alternatively, scaling can be provided, which for instance symbolically indicates a progressive enlargement and reduction in size depending on the rotary position.

For instance, in certain applications optimized adjustment positions can be characterized, such as for revolving doors, cabinets that are open at the top, compartment lids, etc.

Preferably, the piston rod 6 can be put into contact with an adjustable furniture part. The cylinder 1 can be connected to its end that is closed without a piston rod and to a fixed furniture part.

The cylinder 1 of the fluid damper can be closed with a closure part 8 on its end, embodied without any through opening in the piston rod 6, also known as the open face end.

At least one closing element, spring-loaded relative to the piston 4 and having a number of through openings 4.2 corresponding to the number of closing faces 3.2, can be assigned to at least one through opening 4.2.

For instance, the closing element can include at least one wing/vin/vane 3.1 supported rotatably in the piston 4. Upon the motion of the bodies relative to one another and the penetration, associated with that motion, of the piston 4 or piston rod and of the cylinder 1, can progressively close by progressive penetration of the piston 4 into the cylinder 1. The closing can be effected counter to a spring loading as a function of the speed or the pressure on the piston rod 6 the fluid through opening 4.2 in the piston 4 and/or between the piston 4 and cylinder 1.

Both at a standstill and upon motion of the bodies away from one another, the spring loading restores the wing/vin/vane 3.1 and uncovers the through opening 4.2. If the bodies are moving away from one another, the piston 4 and the cylinder 1 can move apart from one another by progressive emergence or pulling out or moving out of the piston 4 from the cylinder 1.

Accordingly, the closing element can include at least one wing/vin/vane 3.1 supported rotatably in the piston 4. By a motion of the piston 4 counter to the cylinder 1 in a first direction, in particular into one another, as a function of the speed or the pressure on the piston rod 6, the wing can progressively close the fluid through opening 4.2 in the piston 4 and/or between the piston 4 and cylinder 1 counter to a spring loading. Upon motion of the piston 4 relative to the cylinder 1 in a second direction opposite the first, in particular apart, the spring loading of the wing/vin/vane 3.1 can be reset and the through opening 4.2 can be opened.

A motion of the piston 4 relative to the cylinder 1 in a first direction, in particular into one another, can then take place whenever the pistons are moved counter to one another, or thus toward one another.

A motion of the piston 4 relative to the cylinder 1 in a second direction, which is opposite the first direction, in particular apart from one another, can occur when the bodies are moved apart from one another, that is, away from one another.

The spring loading can advantageously be produced with a helical spring 5, which requires only little space.

In FIG. 1, the components of the fluid damper that are to be located in the cylinder 1 are shown separately. The fluid damper shown in FIG. 1 comprises a cylinder 1, a locking element 2, a sleeve 3 with a wing 3.1, a piston 4, a helical spring 5, piston rod 6, a notched disk 7, a closure part 8, and an adjusting wheel 9. The damper is secured with the closed face end of the cylinder 1 (left-hand side) on a fixed furniture part. In FIG. 2, the cylinder 1 on its closed end has a internal gear 1.1 and a cone 1.2 located centrally in the gear 1.1. An external gear 2.1 of the locking element 2 can engage this internal gear 1.1. The locking element 2 is a cylindrical sleeve that can be slipped onto end of the piston rod 6 (at point 6.2), and which on its outer surface has at least one cam 2.2 (2.3). The cam 2.2 engages a recess in the piston 4. The part of the fluid damper described thus far serves to keep the piston 4 in a selected radial position.

The piston 4 is provided with a cylindrical portion 4.1 that can be slipped onto the tapered end 6.1 of the piston rod 6, in which portion a fluid through opening 4.2 is formed. The external diameter of this cylindrical portion 4.1 is adapted to the internal diameter of the cylinder 1. Between the locking element 2 and the portion 4.1, the sleeve 3 that has the wing 3.1 can be inserted onto the tapered end 6.1 of the piston rod 6. The insertability is such that the sleeve can rotate radially on the end 6.1. Between the left-hand end of the sleeve and the locking element 2 and/or between the right-hand end of the sleeve 3 and the portion 4.1, the helical spring 5 and 5', respectively, are available on the tapered end 6.1 of the piston rod 6. The helical spring is braced by its one end on the wing 3.1 and by its other end on a stop 4.3 of the piston 4. This helical spring, in the outset position of the fluid damper, keeps the wing 3.1 in a position such that its closing face 3.2 does not cover the fluid through opening 4.2 (FIG. 2).

The notched disk 7 with a notch 7.1 on its circumference is secured radially nonrotatably on the tapered end 6.1 of the piston rod, so that the notched disk can also be rotated when the piston rod 6 rotates. The piston rod 6 is passed rotatably through the closure part 8. On the end of the piston rod 6 that is passed through the closure part 8, upon closure of the adjustable furniture part, the adjusting wheel 9, preferably provided with fluting, can be put into contact with the adjustable furniture part.

The pre-adjustment for the intended usage is done as follows.

Figure 7:
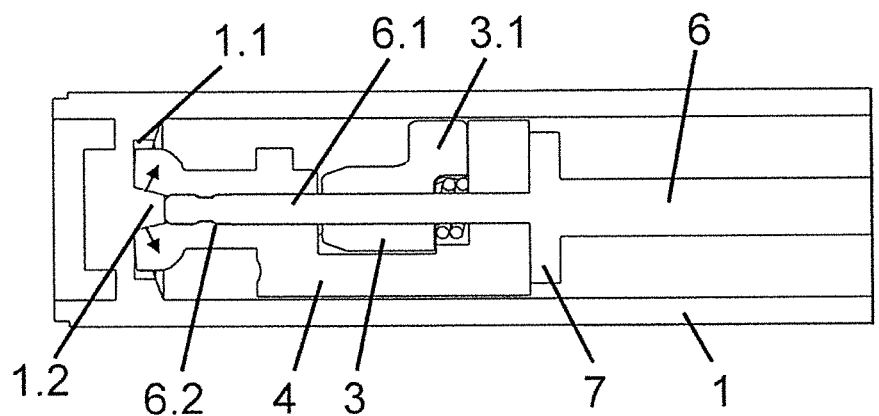
FIG. 7 shows a partial cross section through the fluid damper of FIG. 6.

By manual pressure on the adjusting wheel 9, the internal gear 1.1 and the external gear 2.1 are put into engagement in a selected radial position of the piston 4, as FIG. 7 shows. The cone 1.2 then presses the teeth of the external gear 2.1 apart and wedges them to the teeth of the internal gear 1.1. Thus the radial position of the piston 4 is fixed. Now by means of the adjusting wheel 9, the piston rod 6 is rotated such that the notched disk 7 more or less closes the fluid through opening 4.2, depending on the use made of it. Thus the desired cross section of the opening of the piston 4 for the fluid is fixed. The cone 1.2 can be located on the end of an inner side of the cylinder 1, preferably in the vicinity of the internal gear 1.1.

As also shown in FIG. 7, the teeth of the gear 2.1 are moved away from one another by the pressure of the gear 2.1, or of the piston 4, on the cone 1.2, in particular being moved approximately radially outward. At the least, the teeth of the gear 2.1 are moved away from the piston rod 6, from a longitudinal axis of the piston rod at least in the vicinity of the point 6.2, which can also be called the piston rod head. By means of this motion of the teeth of the gear 2.1 outward, those teeth can be made to mesh with the teeth of the gear 1.1, and furthermore the teeth of the gear 1.1 can be spaced apart, radially to the longitudinal axis of the piston rod 6, from the teeth of the gear 2.1.

By the pressure of the gear 2.1 on the conical cylinder 1.2, a nonrotatable connection between the piston rod 6 and piston 4, in particular between the locking element 2 and the piston rod 6, can be undone at least temporarily. As a result, a low-friction relative motion between the piston rod 6 and the piston 4, or between the piston rod 6 and a detent connection as the locking element 2, which can be embodied in one piece with the piston, can be enabled.

This can be in the form of a double relative nonrotatability. For one thing, the locking element/locking apparatus relative to the piston 4 and/or a nonrotatability of the piston rod 6 relative to the detent connection 2 or the piston 4.

The course of motion upon closure and opening of the bodies at low and high speed is as follows.

The nonrotatability of the piston rod 6 relative to the detent connection 2 and/or the piston 4 can in particular exist in the operating state, that is, when the fluid damper is performing its primary function of damped movement of bodies. Conversely, the nonrotatability can be undone, in accordance with the above description, while the damping action is adjusted by rotating the wheel 9 and thus the piston rod 6 or the notch 7.1 relative to the opening 4.2, and the gear 2.1 can mesh with the conical cylinder 1.2, or the gear 2.1 can mesh with the gear 1.1.

Figure 6:
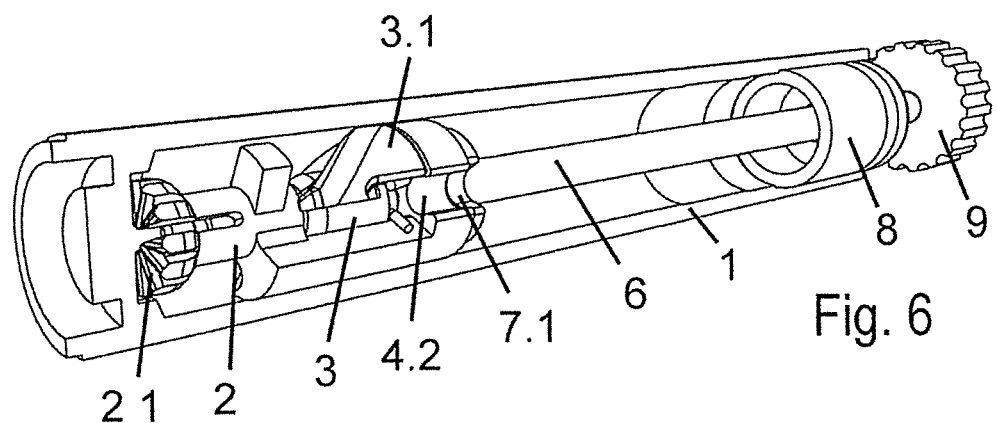
FIG. 6 is a perspective view of the fluid damper. similar to FIG. 4, with the cylinder cut open.

If the closing speed is low, the primary flow of fluid in FIG. 6 is through the fluid through opening 4.2 and the notch 7.1 in front. The wing 3.1 stays in an outset position. The result is only minimal braking action.

At a very high speed, that is, at very high pressure of or on the piston rod 6 (for instance when bodies/piston and cylinder and moved toward one another), the wing 3.1 with its closing face 3.2 closes the fluid through opening 4.2 so much that only a small through-flow cross section is provided by the piston 4. The fluid flows through the outer gap between the cylinder 1 and the piston 4 and causes a counterforce.

If the speed decreases in the process, then toward the end of the process of closing the bodies by the helical spring 5 a rotary motion of the wing 3.1 in the opposite direction is brought about, which leads to a continuous opening of the fluid through opening 4.2. Consequently this results in a reduction in the piston speed and a soft impact on the closing bodies.

It can be seen that the invention can be realized by means of a fluid damper for bodies adjustable relative to one another having a piston 4, guided adjustably in a cylinder 1, which piston is connected to a piston rod 6 that leads out of the cylinder 1 and that can be put into contact with the adjustable furniture part, wherein the cylinder 1 is connected to the closed end, free of a piston rod, and the fixed furniture part, and in the piston 4, at least one through opening 4.2 is provided for fluid located in the cylinder 1;

when there is a motion of the bodies counter to one another and a resultant motion of the piston 4 and cylinder 1 into one another, by the movement into one another of the piston 4 and cylinder 1, by progressive penetration of the piston 4 into the cylinder 1 as a function of the speed or the pressure on the piston rod 6, a wing 3.1 rotatably supported in the piston 4 progressively closes the through opening 4.2 in the piston 4, and upon motion of the bodies away from one another and the attendant motion of the piston 4 and of the cylinder 1 apart from one another with the piston 4 and cylinder 1, by progressive retraction or retracting movement of the piston 4 out of the cylinder 1, a helical spring 5 retracts the wing 3.1 and opens the through opening 4.2;

the piston 4 is embodied cylindrically and is adapted with its external diameter to the internal diameter of the cylinder 1;

the cylinder 1 is closed on the open face end with a closure part 8;

and a detent connection that keeps the piston 4 in a desired position in the cylinder 1 is thrust radially nonrotatably onto the end of the piston rod 6 located in the cylinder, and wherein a notched disk 7 is nonrotatably secured to the piston rod 6, by means of the notch 7.1 the flow cross section of the fluid is pre-adjustable at the point of the fluid through opening 4.2 of the piston 4.

The invention claimed is:

1. A fluid damper for bodies adjustable relative to one another having a piston (4) guided adjustably in a cylinder (1), wherein in the piston (4) and/or between the piston (4) and the cylinder (1) at least one through opening (4.2) for through-flowing fluid is embodied, having adjusting means for adjusting a limitation of at least the maximum possible through-flow cross section of the fluid at the at least one through opening (4.2) of the fluid damper ready for operation; said the piston (4) is connected to a piston rod (6) leading out of the cylinder (1); said adjusting means having a detent connection (2), which holds the piston (4) in a desired position in the cylinder (1); and said detent connection is mounted radially nonrotatably on the end of the piston rod, located in the cylinder;

wherein the detent connection comprises the following components:

a locking element (2) in the form of a sleeve that can be applied to the end (6.1) of the piston rod, the end of which sleeve oriented toward the closed end of the cylinder (1) having a external gear (2.1) and on the other end at least one cam (2.2) engaging the piston (4);

a internal gear (1.1) and located on the inside of the closed end of the cylinder (1), which gear is engaged by the external gear (2.1); and a central cone (1.2), located on the inside at the closed end of the cylinder (1), which cone presses the teeth of the external gear apart from one another into the internal gear (1.1).

2. A fluid damper for bodies adjustable relative to one another having a piston (4) guided adjustably in a cylinder (1), wherein in the piston (4) and/or between the piston (4) and the cylinder (1) at least one through opening (4.2) for through-flowing fluid is embodied, having adjusting means for adjusting a limitation of at least the maximum possible through-flow cross section of the fluid at the at least one through opening (4.2) of the fluid damper ready for operation; said the piston (4) is connected to a piston rod (6) leading out of the cylinder (1); said adjusting means having a detent connection (2), which holds the piston (4) in a desired position in the cylinder (1); and said detent connection is mounted radially nonrotatably on the end of the piston rod, located in the cylinder;

wherein the adjusting means include a notched disk (7), secured nonrotatably on the piston rod (6), by means of which adjusting means at least one notch (7.1) of the through-flow cross section of the fluid at the location of the at least one through opening (4.2) of the piston (4) and/or between the piston (4) and the cylinder (1) is pre-adjustable.

3. A fluid damper for bodies adjustable relative to one another having a piston (4) guided adjustably in a cylinder (1), wherein in the piston (4) and/or between the piston (4) and the cylinder (1) at least one through opening (4.2) for through-flowing fluid is embodied, having adjusting means for adjusting a limitation of at least the maximum possible through-flow cross section of the fluid at the at least one through opening (4.2) of the fluid damper ready for operation; said the piston (4) is connected to a piston rod (6) leading out of the cylinder (1); said adjusting means having a detent connection (2), which holds the piston (4) in a desired position in the cylinder (1); and said detent connection is mounted radially nonrotatably on the end of the piston rod, located in the cylinder;

wherein the closing element includes at least one wing (3.1) supported rotatably in the piston (4), which wing, upon motion of the piston (4) relative to the cylinder (1) in a first direction, as a function of the speed or pressure on the piston rod (6), progressively closes the through opening (4.2) in the piston (4) and/or between the piston (4) and the cylinder (1) counter to a spring loading, and upon motion of the piston (4) counter to the cylinder (1) in a second direction opposite the first direction the spring loading restores the wing (3.1) and opens the through opening (4.2).

* * * * *